Oct. 6, 1970          H. C. TUCKER          3,532,980
                    PEAK VOLTAGE READER
Filed Nov. 22, 1967                    4 Sheets-Sheet 2
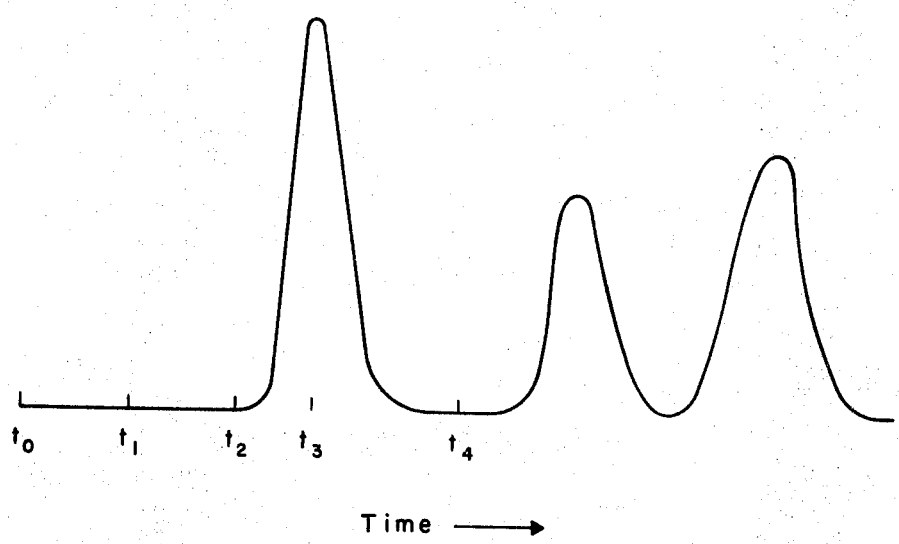
FIGURE 2
FIGURE 3
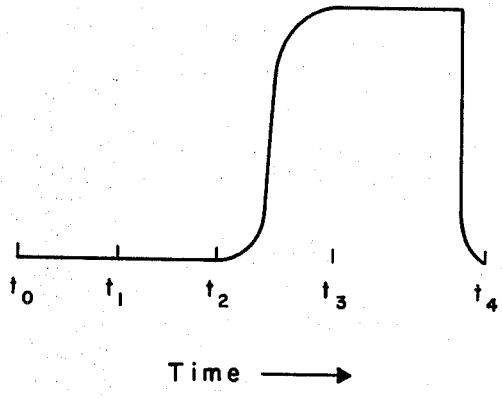
INVENTOR.
Huel C. Tucker
BY
AGENT Oct. 6, 1970                H. C. TUCKER                 3,532,980
                         PEAK VOLTAGE READER
Filed Nov. 22, 1967                              4 Sheets-Sheet 4

INVENTOR.
Huel C. Tucker
BY
AGENT

United States Patent Office 3,532,980
Patented Oct. 6, 1970

3,532,980
PEAK VOLTAGE READER
Huel C. Tucker, Texas City, Tex., assignor to Monsanto Company, St. Louis, Mo., a corporation of Delaware
Filed Nov. 22, 1967, Ser. No. 684,991
Int. Cl. G01r *19/06, 19/16*
U.S. Cl. 324—103
12 Claims

ABSTRACT OF THE DISCLOSURE

An electronic peak voltage reader for measuring the difference between the maximum voltage occurring in a given time period and the voltage at the beginning of that period.

BACKGROUND OF THE INVENTION

The present invention relates to a circuit for measuring the maximum difference of a unipolar voltage signal occurring during a predetermined time period. More particularly, the present invention relates to an electrical circuit for measuring the peak height of a signal derived from an analyzer system.

Most analyzer instruments, both laboratory and process type, are inherently data sampling devices. For example, in gas chromatography, a quantity of sample is introduced into a chromatographic column and a carrier gas is passed through the column. The sample components are separated in the column and eluted therefrom one by one, each at a characteristic elapsed time known as the elution time. The eluent from the column passes through a detecting unit such as a thermal conductivity bridge or a hydrogen flame detector, and each injection of sample generates a train of signal peaks quantitatively representing, respectively, the separate components of the sample. The elapsed time between sample injection and generation of a particular signal peak identifies the particular component and the magnitude of the peak provides a quantitative measure of the amount of this particular component in the sample.

In the case of process control by gas chromatography, the stream being monitored is periodically sampled and the magnitude of the peaks of the components of interest observed. Manual reduction of data obtained from a chart recording of the peaks is not only subject to error but is rather time consuming, with the result that efficient on-line process control is not easily carried out. Various devices, means and methods have been used in the past in an attempt to sense and transmit the concentration of the components of interest. Devices known as peak readers, trend recorders, and memory read-out systems are available for various analyzer systems from several sources. Most of these systems attempt to read the "maximum" or "peak height" value for a key component from a process analyzer such as a gas chromatograph, record this peak value and then transmit it to a control system which will adjust process conditions if the concentration of the key component is above or below a certain predetermined value. These systems range from mechanical devices to completely transistorized electronic systems, but they have generally proved to be inadequate because of unreliability, high cost, and high maintenance and complexity which requires special training of personnel.

SUMMARY

A simple and inexpensive electronic peak voltage reader or "peak picker" of superior design has now been discovered for producing accurate and reproducible results with analyzers, particularly process-type, which produce output signals in the form of cyclic trains of signal peaks.

It is, accordingly, an object of the present invention to provide an electrical circuit capable of measuring the difference beween the maximum voltage occurring in a given time period and the voltage at the beginning of that period, said voltage being derived from an analyzer system. A further object of the present invention is to provide a signal peak measuring system suitable for use with a gas chromatograph whereby a measure of the maximum values of selected components of the chromatographic output may be obtained. These and other objects of the invention will become apparent from the following description, drawings, and appended claims.

According to the present invention, there is provided an electronic peak voltage reader comprising in combination, a first parallel circuit, one junction of said first parallel circuit connected to a system input terminal through a unidirectional conducting means, a first branch of said first parallel circuit containing a first capacitance element, a second branch of said first parallel circuit containing a first switching means, a second parallel circuit, one junction of said second parallel circuit connected to the other junction of said first parallel circuit, a first branch of said second parallel circuit containing a second capacitance element, a second branch of said second parallel circuit containing a second switching means, means whereby said first capacitance element may be charged to an input voltage appearing at said system input terminal when said first and second switching means are closed and said second capacitance element may by charged to any increase in said input voltage occuring after said first and second switching means are opened.

There is also provided by the present invention a system for producing an electrical output indicative of the trend of the maximum values of selected components of a series of samples comprising in combination, analyzer means for determining components of a sample, sample introduction means for cyclically introducing a sample into said analyzer means, said analyzer means generating upon each introduction of a sample a train of signal peak voltages, said signal peak voltages providing a measure of said components in said sample, an electronic peak voltage reader as defined above, programming means for synchronously actuating said first and second switching means in said electronic peak voltage reader together with said sample introducing means for applying to said electronic peak voltage reader selected portions of said train of signal peak voltages.

DESCRIPTION OF THE DRAWINGS

The attached drawings depict the apparatus of the present invention but are not to be construed as a limitation on the scope thereof.

FIG. 2 is a typical recording of the output from a gas chromatographic system such as that used in the embodiment of FIG. 1.

FIG. 3 is a plot showing the output from the electronic peak voltage reader of the present invention.

DESCRIPTION OF THE PREFERRED EMBODIMENT

Figure 1:
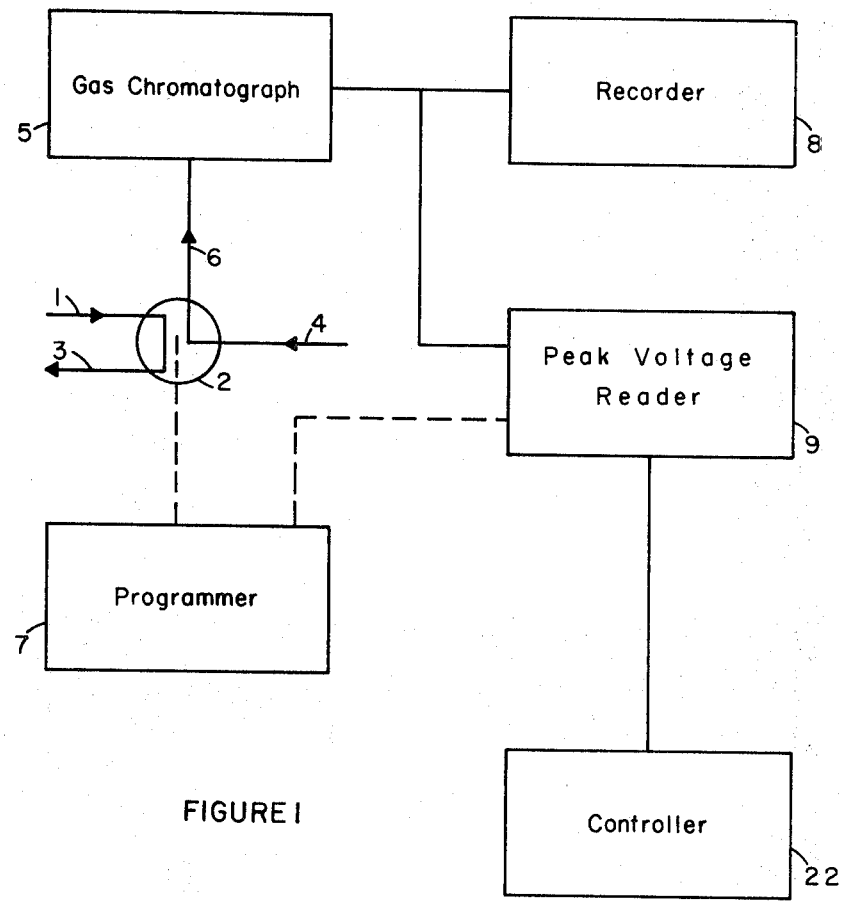
FIG. 1 is a schematic block diagram of a process control system showing one embodiment of the present invention.

Referring now to FIG. 1, a stream being analyzed flows from line 1 through valve 2 and exists via line 3. A carrier was such as helium flows from line 4 through valve 2 and enters gas chromatographic analyzer 5 via line 6.

Valve 2 is designed so that a fixed volume of sample may be taken from the stream being analyzed and transported to gas chromatographic analyzer 5 by means of the carrier gas entering valve 2 through line 4. A valve suitable for doing this is described in U.S. Pat. 3,294,119. The system is energized by a signal from programmer 7 which actuates valve 2 causing a sample to be introduced into gas chromatographic analyzer 5 which separates and detects the various components in the sample. Detection of the components is accomplished by any means capable of converting the signal peaks from the components into voltage peaks. Examples of suitable detectors are so-called hot-wire detectors or hydrogen-flame detectors. The introduction of a sample which starts the cycle is designated as time $t_0$ on FIG. 2. The trace of FIG. 2 shows a recording of the output of chromatographic analyzer 5 which might be obtained by recorder 8. At time $t_1$, a predetermined time lapse after $t_0$, a signal from programmer 7 actuates electronic peak voltage reader 9.

Figure 4:
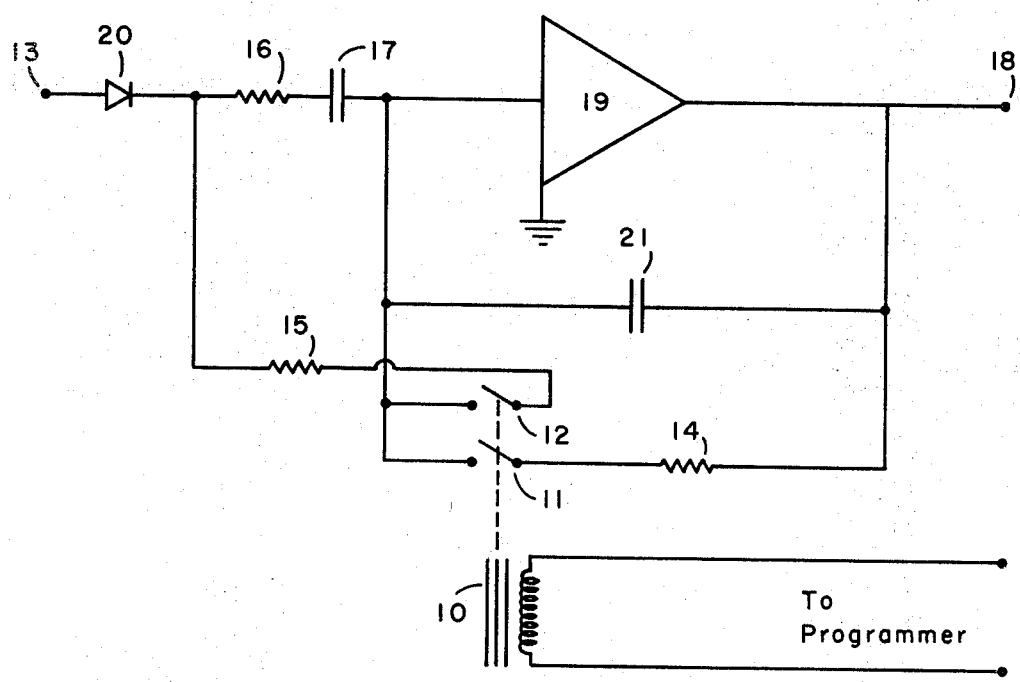
FIG. 4 is a schematic diagram of a preferred embodiment of the electronic peak voltage reader of the present invention.

Reference is now made to FIG. 4 for a detailed operation of electronic peak voltage reader 9. The signal from programmer 7 corresponding to time $t_1$ shown in FIG. 2 results in the application of a voltage to the coil of relay 10 which in turn causes normally open switches 11 and 12 to close. The output from gas chromatographic analyzer 5, appears as a voltage at input terminal 13 of electronic peak voltage reader 9. Resistance element 14 is chosen to be much smaller than resistance element 15 and resistance element 16 and capacitor 17 have values such that the RC time constant of element 16 and capacitor 17 is small enough to allow rapid changes of the voltage across capacitor 17. Under these conditions, the output voltage, which is the voltage across capacitor 21, appearing at output terminal 18 of high-impedance inverting amplifier 19 assumes a value approaching zero and the voltage across capacitor 17 assumes the input voltage, appearing at input terminal 13, less the forward drop across diode 20. Diode 20 is kept biased such that the voltage drop across it is always greater than that required to cause conduction. Consequently, when switches 11 and 12 are closed, the voltage across capacitor 17 remains proportional to or tracks the input voltage at terminal 13 less the drop across diode 20.

If at time $t_2$ on FIG. 2 programmer 7 removes the voltage from relay coil 10 such that switches 11 and 12 are caused to open, capacitors 17 and 21 cannot discharge because of the very high back-resistance of diode 20. However, as the input voltage appearing at input terminal 13 increases due to the emergence of a peak from gas chromatographic analyzer 5, the voltage across capacitor 17 increases proportionately. Since the identical current that charges capacitor 17 also charges capacitor 21, a proportional increase in the voltage across capacitor 21 occurs which in turn appears as the output voltage at output terminal 18. The voltage across capacitor 17 is given by the equation:

(1) $$V_{17} = \frac{1}{C_{17}} \int_{t_2}^{t_3} i\, dt + E_{C_{17}}$$

where $t_2$ and $t_3$ correspond to the times shown in FIG. 2, $E_{C_{17}}$ is the voltage across capacitor 17 at time $t_2$ and $C_{17}$ is the capacitance of capacitor 17. The voltage across capacitor 21 is given by the equation:

(2) $$V_{21} = \frac{1}{C_{21}} \int_{t_2}^{t_3} i\, dt$$

where $t_2$ and $t_3$ are the same as in Equation 1 and $C_{21}$ is the capacitance across capacitor 21. Since the output voltage (E output) occurring at terminal 18 can be expressed in the equation:

(3) $$E \text{ output} = \frac{Q}{C_{21}}$$

where Q is the increase in charge on each capacitor during the time interval $t_2 - t_3$ and since (4) $$E \text{ input} = \frac{Q}{C_{17}}$$

where E input is the difference in voltage appearing at input terminal 13 between the times $t_2$ and $t_3$, then by dividing Equation 4 into Equation 3 and transposing, it is seen that (5) $$E \text{ output} = E \text{ input} \times \frac{C_{17}}{C_{21}}$$

Thus, the output voltage is seen to be a function of the change of input voltage only and is independent of any initial charge of capacitor 17. Thus, it is observed that the output voltage occurring at output terminal 18 reflects only the peak height of the signal peak being measured, i.e., it is independent of any variance in the background such as might be caused by a drifting baseline. Due to the high back resistance of diode 20, capacitors 17 and 21 cannot discharge with the result that the output appearing at output terminal 18 is maintained at its maximum reading until on a signal from programmer 7 at time $t_4$, relay 10 closes switches 11 and 12 resetting the output voltage to zero and the voltage of capacitor 17 to the input voltage appearing at terminal 13 less the drop across diode 20. FIG. 3 shows a plot of the output as seen at terminal 18 for the above-described cycle. The times $t_1$, $t_2$, and $t_3$ correspond to the same times as on FIG. 2.

While only one signal peak has been used to illustrate the operation of the present invention, it is not limited thereto. The electronic peak voltage reader can be adapted to read any number of peaks and they need not be consecutive. By proper adjustment of programmer 7, the system can be utilized to select certain peaks while ignoring others. For example, in FIG. 2, the peak reader could be utilized to obtain the peak heights of all three signal peaks, any one of them or any combination thereof. For each signal peak read, the above described cycle would be repeated. The output from terminal 18 can be transmitted to controller 22 which can be pneumatic, electrical or any type process controller for effecting any change required in the stream being monitored. While in the above embodiment the invention has been described wth reference to the use of a controller means such as might be employed in a closed loop control system, it is to be understood that the output from terminal 18 can be equally well applied to a recorder, computer, digital read-out system or any other instrument capable of receiving the information from the analyzer.

Figure 5:
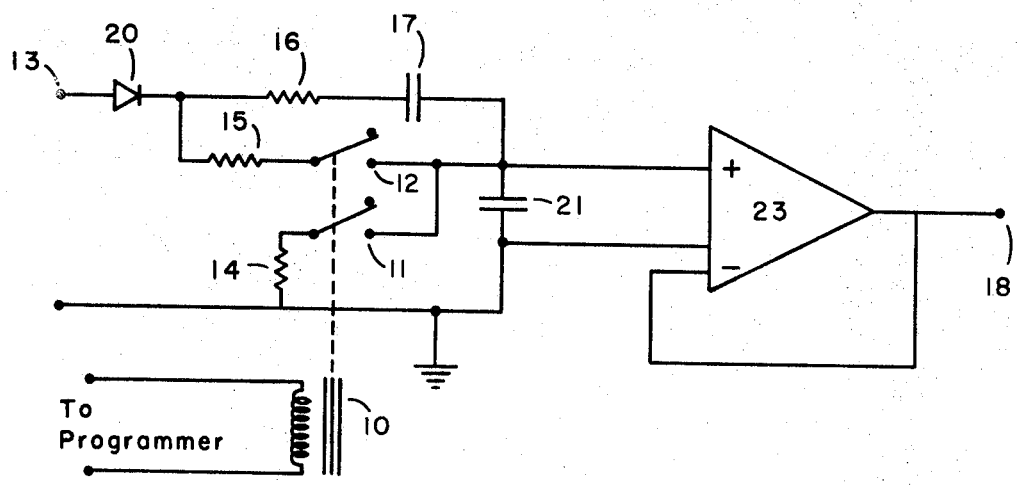
FIG. 5 is a schematic diagram showing another embodiment of the present invention.

It is to be understood that the specific circuit set forth in FIG. 4 utilizing an inverting amplifier contains only a preferred embodiment of the electronic peak voltage reading apparatus of the present invention. Another embodiment of the apparatus is described in FIG. 5 where the characters used therein are the same as in FIG. 4. As is readily seen by those skilled in the art, the process by which the desired voltage peak is stored on capacitor 21 is fundamentally the same as that described above for FIG. 4. In the case set forth in FIG. 5, (6) $$E \text{ output} = E \text{ input} \times \frac{C_{17}}{C_{17} + C_{21}}$$

where E input is the difference in voltage appearing at input terminal 13 between the times $t_2$ and $t_3$. As is also seen in FIG. 5, the output voltage (E output) across capacitor 21 can be applied to the input of any noninverting high-impedance amplifier such as high-impedance differential input amplifier 23. As will also be apparent to those skilled in the art, any high-impedance voltage measuring device such as a high-impedance voltmeter may be substituted for amplifier 23 and connected in parallel across capacitor 21 in order to obtain the output voltage (E output).

The following table lists some typical values for the components used in the embodiments set forth in FIGS. 4 and 5. It is to be expressly understood, however, that the values of the components used in the present invention are not limited thereto. The characters used in the table are the same as those employed in FIGS. 4 and 5.

| Component No.: | Value |
| --- | --- |
| 14 | 100Ω |
| 15 | 100,000Ω |
| 16 | 100,000Ω |
| 17 | mf 0.1 |
| 20 | 1N459 |
| 21 | mf 0.1 |

In general, the electronic peak voltage reading apparatus of the present invention can be used with any type of analytical instrument which analyzes maxima or minima for component compositions and where the component compositions can be converted to a proportional voltage. Examples of such analyzer systems include gas chromatographs, specific gravity analyzers, infrared analyzers and ultraviolet analyzers. Also, the apparatus may be used in conjunction with an alarm system to indicate potentially dangerous levels of certain components.

It will be understood by those skilled in the art that many modifications and changes may be made in the apparatus described herein without departing from the scope thereof. For example, electro-mechanical switches 11 and 12 and relay coil 10 can be replaced by suitable electronic switching means such as transistors.

What is claimed is:

1. An electronic peak voltage reader comprising in combination a first parallel circuit, one junction of said first parallel circuit connected to a system input terminal through a unidirectional conducting means, a first branch of said first parallel circuit containing a first capacitance element, a second branch of said first parallel circuit containing a first switching means, a second parallel circuit, one junction of said second parallel circuit connected to the other junction of said first parallel circuit, a first branch of said second parallel circuit containing a second capacitance element, a second branch of said second parallel circuit containing a second switching means, means for charging said first capacitance element to an input voltage appearing at said system input terminal when said first and second switching means are closed and for charging said second capacitance element to any increase in said input voltage occurring after said first and second switching means are opened, and means for providing readout of the peak voltage as represented by the voltage across the second capacitor.

2. The peak voltage reader of claim 1 wherein said second parallel circuit contains a third branch, said third branch containing a means for measuring the voltage stored on said second capacitance element after said first and second switching means are opened.

3. The peak voltage reader of claim 2 wherein said measuring means comprises a high-impedance voltmeter.

4. The peak voltage reader of claim 1 in combination with a non-inverting high-impedance amplifying means for producing an output voltage proportional to the voltage stored on said second capacitance element after said first and second switching means are opened.

5. The peak voltage reader of claim 4 wherein said amplifying means is a high-impedance differential input amplifier.

6. The peak voltage reader of claim 1 wherein said means whereby said first capacitance element may be charged to an input voltage appearing at said system input terminal when said first and second switching means are closed and said second capacitance element may be charged to any increase in said input voltage occurring after said first and second switching means are open comprises a high-impedance inverting amplifier having an input summing junction and an output terminal, said high-impedance inverting amplifier forming part of a third branch of said second parallel circuit, said input summing junction connected to a point between said first and second capacitance elements.

7. The peak voltage reader of claim 6 wherein said first branch of said first parallel circuit contains a first resistance element located between said first capacitance element and the junction of said first parallel circuit connected to said unidirectional means and said second branch of said first parallel circuit contains a second resistance element.

8. The peak voltage reader of claim 7 wherein a relay means is provided for opening and closing both of said first and second switching means.

9. The peak voltage reader of claim 8 wherein said unidirectional conducting means is a diode.

10. The peak voltage reader of claim 9 wherein said first capacitance element and said first resistance element have values such that the RC time constant for said elements is small enough to allow rapid changes in the voltage across said first capacitance element.

11. A system for producing an electrical output indicative of the trend of the maximum values of selected components of a series of samples comprising in combination, analyzer means for determining components of a sample, sample introducing means for cyclically introducing a sample into said analyzer means, said analyzer means generating upon each introduction of a sample a train of signal peak voltages, said signal peak voltages providing a measure of said components in said sample, an electronic peak voltage reader as defined in claim 1, programming means for synchronously actuating said first and second switching means in said electronic peak voltage reader together with said sample introducing means for applying to said electronic peak voltage reader selected portions of said train of signal peak voltages.

12. The system of claim 11 wherein said analyzer means comprises a gas chromatograph.

References Cited

UNITED STATES PATENTS

| 3,109,103 | 10/1963 | Wilhelmsen | 307—230 |
| 3,264,569 | 8/1966 | Lefferts | 330—9 |

RUDOLPH V. ROLINEC, Primary Examiner

E. F. KARLSEN, Assistant Examiner

U.S. Cl. X.R.

324—111; 328—165